United States Patent
Binder et al.

(10) Patent No.: US 12,076,939 B2
(45) Date of Patent: Sep. 3, 2024

(54) INDUCTION CONNECTION SLEEVE

(71) Applicant: agru Kunststofftechnik Gesellschaft m.b.H., Bad Hall (AT)

(72) Inventors: Hermann Binder, Bad Hall (AT); Josef Tame, Pfarrkirchen (AT)

(73) Assignee: agru Kunststofftechnik Gesellschaft m.b.H., Bad Hall (AT)

(*) Notice: Subject to any disclaimer, the term of this patent is extended or adjusted under 35 U.S.C. 154(b) by 848 days.

(21) Appl. No.: 17/113,958

(22) Filed: Dec. 7, 2020

(65) Prior Publication Data

US 2021/0114314 A1    Apr. 22, 2021

Related U.S. Application Data

(62) Division of application No. 15/558,613, filed as application No. PCT/AT2016/050064 on Mar. 17, 2016, now abandoned.

(30) Foreign Application Priority Data

Mar. 18, 2015 (AT) .............. A 50219/2015

(51) Int. Cl.
  *B29C 45/16* (2006.01)
  *B29C 45/14* (2006.01)
  (Continued)

(52) U.S. Cl.
  CPC .. *B29C 66/72523* (2013.01); *B29C 45/14065* (2013.01); *B29C 45/1671* (2013.01);
  (Continued)

(58) Field of Classification Search
  CPC .... B29C 45/14065; B29C 2045/14147; B29C 45/1671; B29C 2045/1454;
  (Continued)

(56) References Cited

U.S. PATENT DOCUMENTS 2,739,829 A    3/1956 Pedlow et al.
3,061,503 A   10/1962 Gould et al.
(Continued)

FOREIGN PATENT DOCUMENTS

DE    102008059795 A1 *  6/2010   ......... B29C 45/1671
JP    S60-32632 A          2/1985
(Continued)

OTHER PUBLICATIONS

Translation of DE-102008059795-A1 (Year: 2010).*
(Continued)

*Primary Examiner* — John J DeRusso
(74) *Attorney, Agent, or Firm* — Collard & Roe, P.C.

(57) ABSTRACT

A method for producing an induction connection sleeve includes laying up a first induction heating element in a first injection-mold half; laying up a second induction heating element in a second injection-mold half; mutually compressing the first and second injection-mold halves; injecting a thermoplastic plastics material into first and second molding cavities; opening the first and the second injection-mold halves; ejecting an internal part of a sleeve body having induction heating elements from one of the injection-mold halves; laying up the internal part of the sleeve body having the induction heating elements in a third injection-mold half; closing a third molding cavity; injecting a thermoplastic plastics material into the third molding cavity; opening the third molding cavity; and ejecting the finished induction connection sleeve.

4 Claims, 9 Drawing Sheets

(51) Int. Cl.
*B29C 65/00* (2006.01)
*B29C 65/20* (2006.01)
*B29C 65/36* (2006.01)
*B29C 65/72* (2006.01)
*B29C 65/78* (2006.01)
*F16L 39/00* (2006.01)
*F16L 47/02* (2006.01)
*B29L 31/24* (2006.01)

(52) U.S. Cl.
CPC .......... *B29C 65/20* (2013.01); *B29C 65/3648* (2013.01); *B29C 65/72* (2013.01); *B29C 65/7802* (2013.01); *B29C 66/1122* (2013.01); *B29C 66/1142* (2013.01); *B29C 66/5221* (2013.01); *B29C 66/52298* (2013.01); *B29C 66/712* (2013.01); *B29C 66/7392* (2013.01); *B29C 66/73921* (2013.01); *F16L 39/005* (2013.01); *F16L 47/02* (2013.01); *B29C 2045/14147* (2013.01); *B29C 45/14311* (2013.01); *B29C 2045/14327* (2013.01); *B29C 45/14491* (2013.01); *B29C 2045/1454* (2013.01); *B29C 65/7805* (2013.01); *B29C 66/73116* (2013.01); *B29L 2031/24* (2013.01)

(58) Field of Classification Search
CPC . B29C 45/14491; B29C 65/3644–3652; B29L 2031/24
See application file for complete search history.

(56) References Cited

U.S. PATENT DOCUMENTS

| | | | |
|---|---|---|---|
| 4,842,305 A | 6/1989 | Kistenich et al. | |
| 5,252,157 A | 10/1993 | Inhofe, Jr. | |
| 5,433,484 A | 7/1995 | Ewen et al. | |
| 5,462,314 A | 10/1995 | Goto et al. | |
| 5,505,898 A | 4/1996 | Goto et al. | |
| 5,618,065 A | 4/1997 | Akiyama | |
| 6,135,508 A | 10/2000 | Genoni et al. | |
| 6,394,502 B1 | 5/2002 | Andersson | |
| 7,614,661 B1 | 11/2009 | Ruffle et al. | |
| 2012/0003411 A1 | 1/2012 | Struebin et al. | |
| 2014/0277482 A1* | 9/2014 | Gfeller | A61F 2/4455 264/261 |
| 2015/0020977 A1 | 1/2015 | King et al. | |

FOREIGN PATENT DOCUMENTS

| | | |
|---|---|---|
| JP | H03-72197 U1 | 7/1991 |
| JP | H03-75394 U | 7/1991 |
| JP | H06-278211 A | 10/1994 |
| JP | H09-323359 A | 12/1997 |
| JP | 2001-208274 A | 8/2001 |
| WO | 98/37353 A1 | 8/1998 |
| WO | 99/46532 A1 | 9/1999 |
| WO | 01/20219 A1 | 3/2001 |
| WO | 2007/128384 A2 | 11/2007 |

OTHER PUBLICATIONS

International Search Report of PCT/AT2016/050064, dated Sep. 15, 2016.
European Communication under Rule 164(2) and Article 94(3) EPC dated Nov. 20, 2019 in EP 16 720 983.2-1014, with English translation of relevant parts.

* cited by examiner

INDUCTION CONNECTION SLEEVE

CROSS REFERENCE TO RELATED APPLICATIONS

This application is a divisional of and Applicant claims priority under 35 U.S.C. §§ 120 and 121 of U.S. application Ser. No. 15/558,613 filed on Sep. 15, 2017, which application is a national stage application under 35 U.S.C. § 371 of PCT Application No. PCT/AT2016/050064 filed on Mar. 17, 2016, which claims priority under 35 U.S.C. § 119 from Austrian Patent Application No. A 50219/2015 filed on Mar. 18, 2015, the disclosures of each of which are hereby incorporated by reference. A certified copy of priority Austrian Patent Application No. A 50219/2015 is contained in parent U.S. application Ser. No. 15/558,613. The International Application under PCT article 21(2) was not published in English.

BACKGROUND OF THE INVENTION

1. Field of the Invention

The invention relates to an induction connection sleeve for connecting by fusing plastic pipes, and to a production method for producing an induction connection sleeve of this type, and to a production method for producing a welded connection between two plastic pipes while using the induction connection sleeve.

2. Description of the Related Art

WO 2007/128384 A2 discloses an induction connection sleeve in which two bush-shaped induction heating elements are embedded in a sleeve body, said induction heating elements on the internal shell surface thereof not being surrounded by the sleeve body and thus configured directly receptacle portions for receiving connection portions of plastic pipes to be connected. If the plastic pipes to be connected are pushed into the sleeve body, the external skin of the plastic pipes bears directly on the internal shell surface of the induction heating elements. This configuration of an induction connection sleeve has the disadvantage that the plastic pipe connects to the internal shell surface of the induction heating elements only to a limited extent.

An induction connection sleeve is known from JP2001208274A in which two induction heating elements that are configured in a bush-shaped manner are embedded in a sleeve body and surround receptacle portions for receiving connection portions of plastic pipes to be connected. This configuration of an induction connection sleeve has the disadvantage that the induction heating elements in the production process of the induction connection sleeve can be positioned in the sleeve body only with great difficulty. When using an induction connection sleeve having an induction heating element that is not positioned so as to be centric, this can result in the receptacle portions when viewed across the circumference not being heated in a uniform manner.

SUMMARY OF THE INVENTION

The present invention is based on the object of achieving an induction connection sleeve which can be produced in a simple manner and offers a high degree of functional reliability. Moreover, a method for using an induction connection sleeve of this type is to be specified.

This object is achieved by an induction connection sleeve in accordance with one aspect of the invention, and by the method for producing an induction connection sleeve in accordance with another aspect of the invention, respectively, and by the method for producing a welded connection with the aid of the induction connection sleeve in accordance with a further aspect of the invention.

According to the invention, an induction connection sleeve is configured for connecting by fusing plastic pipes. The induction connection sleeve comprises a sleeve body from an injection-molded thermoplastic plastics material, having a first and a second receptacle portion for receiving first and second connection portions of the plastic pipes to be connected, said receptacle portions being disposed in a mutually coaxial manner;

a first induction heating element which is configured in a bush-shaped manner and has recesses that are disposed in the circumference, said first induction heating element being embedded in the sleeve body, wherein the first induction heating element surrounds the first receptacle portion of the sleeve body;

a second induction heating element which is configured in a bush-shaped manner and has recesses disposed in the circumference, said second induction heating element being embedded in the sleeve body, wherein the second induction heating element surrounds the second receptacle portion of the sleeve body. The sleeve body comprises an internal part, said internal part configuring the two receptacle parts, and the induction heating elements being received on said internal part in such a manner that the recesses of the induction heating elements are penetrated by the internal part, said recesses on the external circumference thereof in the region of the induction heating elements terminating flush with the internal part. The sleeve body moreover comprises an external part which is connected in a materially integral manner to the internal part and surrounds the external circumference of the induction heating elements, wherein the induction heating elements are entirely enclosed by the internal part and by the external part.

An advantage of the configuration of the induction connection sleeve according to the invention lies in that the production of the induction connection sleeve is facilitated by the specified construction of the latter, on account of which the dimensional accuracy of the induction connection sleeve is improved. In particular, the induction heating element in the production process can be positioned in a simple and positionally accurate manner within the sleeve body. It can be achieved on account thereof that the induction heating elements that are configured in bush-shaped manner are positioned so as to be as precisely coaxial as possible with the two receptacle portions of the sleeve body, and that the induction connection sleeve has a high dimensional accuracy. When an induction connection sleeve of this type is used for connecting two plastic pipes it can thus be achieved that the receptacle portions of the sleeve body when viewed across the circumference are uniformly heated and uniform fusing of the internal part of the sleeve body can thus be achieved. On account thereof, a connection of two plastic pipes having the induction connection sleeve according to the invention has a high degree of strength and tightness, respectively.

It can furthermore be expedient for the internal part of the sleeve body to be formed from a first plastics from the group of thermoplastic plastics which has a first melting point, and for the external part of the sleeve body to be formed from a second plastics, different from the first plastics, from the group of thermoplastic plastics which has a second melting point, wherein the melting point of the second plastics is higher than the melting point of the first plastics. It is of advantage herein that it can be achieved on account thereof that in the use of the induction connection sleeve, when the sleeve body is being heated, only the internal part of the sleeve body is fused and the external part of the sleeve body remains dimensionally stable. A stable and tight connection of the two plastic pipes to be connected can be achieved on account thereof.

It can furthermore be provided that an adhesive agent layer is configured between the internal part and the external part. It is of advantage herein that on account thereof the internal part and the external part of the sleeve body can be fixedly interconnected and the sleeve body thus can have a high degree of strength.

It can moreover by provided that a continuous receptacle portion having a cylindrical internal shell surface for receiving connection portions of the plastic pipes to be connected is configured on the internal part, wherein the first and the second receptacle portion are configured in the continuous receptacle portion. It is of advantage herein that, in particular when assembling double-walled plastic pipes, the induction connection sleeve prior to joining of the two plastic pipes can be push-fitted over one of the two plastic pipes. Once the two plastic pipes have been placed in relation to one another the induction connection sleeve can subsequently be displaced axially into the connection region of the two plastic pipes. Moreover, an induction connection sleeve that is configured in this manner is simple and cost-effective to produce.

It can furthermore be provided that an external shell surface of the external part is configured so as to emanate from the longitudinal center of the sleeve body and taper in the direction toward an end face of the sleeve body. It is of advantage herein that the sleeve body on account thereof can be demolded in a simple manner from an injection mold for producing the induction connection sleeve.

A specification according to which it can be provided that the wall thickness of the induction heating element is between 30% and 70%, in particular between 40% and 60%, preferably between 47% and 53%, in relation to the wall thickness of the internal port of the sleeve body is also advantageous. The surprising advantage of sufficient fusing of the internal part of the sleeve body being able to be achieved at the lowest possible input of energy into the induction heating elements in order for a good connection to be able to be produced between the two plastic pipes to be connected arises in particular at this shell strength ratio, wherein the internal part is not excessively fused in order for a dimensional stability of the internal part to be able to be maintained.

According to one refinement it is possible for the width of the first and the second induction heating element to be between 15% and 45%, in particular between 25% and 35%, preferably between 26% and 30% in relation to the width of the sleeve body. The surprising advantage of sufficient fusing of the internal part of the sleeve body being able to be achieved at the lowest possible input of energy into the induction heating elements in order for a good connection to be able to be produced between the two plastic pipes to be connected arises in particular at this width ratio, wherein the internal part is not excessively fused in order for a dimensional stability of the internal part to be able to be maintained.

It can moreover be provided that at least one position-securing element is disposed on the sleeve body, said position-securing element in relation to one of the receptacle portions being disposed so as to project radially in the direction toward the center of the sleeve body. It is of advantage herein that the position-securing element can serve for centering the induction connection sleeve on one of the plastic pipes, on the one hand. Moreover, the induction connection sleeve by way of the position-securing element can be jammed on the external diameter of one of the plastic pipes.

In the case of the method for producing an induction connection sleeve it is provided that the production method comprises the following method steps:

laying up a first induction heating element in a first injection-mold half, wherein the first injection-mold half has a first molding cavity for receiving the first induction heating element, said first molding cavity having an available diameter which corresponds to the external diameter of the first induction heating element, wherein the first induction heating element is received in a positioned manner in the first injection-mold half;

laying up a second induction heating element in a second injection-mold half that interacts with the first injection-mold half, wherein the second injection-mold half has a second molding cavity for receiving the second induction heating element, said second molding cavity having an available diameter which corresponds to the external diameter of the second induction heating element, wherein the second induction heating element is received in a positioned manner in the second injection-mold half;

mutual compressing of the first and the second injection-mold half, wherein the first and/or the second injection-mold half have/has a first mold core which for receiving the induction heating elements is disposed so as to be centric to the molding cavities and serves for molding a first and a second receptacle portion of the induction connection sleeve;

injecting a thermoplastic plastics material into the first and the second molding cavity, wherein an internal part of a sleeve body of the induction connection sleeve is formed, said internal part in the internal side having the first and the second receptacle portion, and the induction heating elements at least in regions being embedded in said internal part, wherein recesses that are disposed in the circumference of the induction heating elements are penetrated by the plastics material of the internal part;

opening the first and the second injection-mold half;

ejecting the internal part of the sleeve body having the induction heating elements molded thereon from one of the injection-mold halves;

laying up the internal part of the sleeve body having the induction heating elements molded thereon in a third injection-mold half, wherein the third injection-mold half has a third molding cavity for receiving the internal part of the sleeve body, a further mold core for positioning the internal part being disposed in said third molding cavity, and wherein a radial gap for molding an external part of the sleeve body is configured between the external circumference of the internal part and the third molding cavity;

closing the third molding cavity;

injecting a thermoplastic plastics material into the third molding cavity, wherein an external part of the sleeve body is formed;

opening the third molding cavity;

ejecting the finished induction connection sleeve.

It is of advantage in the method according to the invention that the induction connection sleeve by the method steps described can be produced in such a manner that the induction heating elements can be positioned as accurately as possible in the sleeve body. Moreover, the production method described can be readily automated in order for induction connection sleeves of this type to be able to be produced in a mass-production method. Moreover, the production method can be implemented in a very simple and therefore cost-effective manner in two injection-molding steps.

It can furthermore be expedient for a fourth injection-mold half having a fourth molding cavity to be provided for closing the third molding cavity, said fourth molding cavity interacting with the third molding cavity of the third injection-mold half. It is of advantage herein that the induction connection sleeve on account thereof in relation to the longitudinal center thereof can be configured so as to be symmetrical and thus be produced in a simple manner.

It can moreover be provided that the first and the third injection-mold half are disposed on a common clamping plate, and that the second and the fourth injection-mold half are disposed on a common clamping plate, wherein the first and the third injection-mold half form a nozzle side, and the second and the fourth injection-mold half form an ejector side and are moved simultaneously. It is of advantage herein that only one extruder thus has to be present for producing the induction connection sleeve, so as to be able to mold the sprue on the nozzle side. Moreover, only one actuator has to be present on the ejector side, said actuator moving the second and the fourth injection-mold half simultaneously.

It can furthermore be provided that ejecting the internal part of the sleeve body having the induction heating elements molded thereon and/or ejecting the finished induction connection sleeve are/is carried out by means of ejectors which are disposed in one of the injection-mold halves. It is of advantage herein that the internal part of the sleeve body having the induction heating elements molded thereon and/or the finished induction connection sleeve do not have to be manually removed from one of the injection-mold halves, but that ejecting is carried out automatically.

In the case of the method for producing a welded connection between a first plastic pipe and a second plastic pipe it is provided that the method comprises the following method steps:

providing the first plastic pipe;

providing the induction connection sleeve having a sleeve body which has a width in the axial direction;

push-fitting the induction connection sleeve onto the first plastic pipe such that the induction connection sleeve by way of the entire width of the sleeve body-surrounds the first plastic pipe;

providing the second plastic pipe;

coaxially aligning the second plastic pipe in relation to the first plastic pipe and disposing the former directly next to the latter;

axially displacing the induction connection sleeve such that the latter in part surrounds the first plastic pipe and the second plastic pipe;

positioning an inducing device in the region of the induction connection sleeve and by means of the inducing device inducing a current in the induction connection sleeve such that the sleeve body at least in part is softened and connects in a materially integral manner to the two plastic pipes.

It is of advantage in this method for producing the welded connection that the induction connection sleeve on account of the design embodiment thereof can be pushed entirely over the first plastic pipe. The second plastic pipe can thus be positioned precisely in relation to the first plastic pipe.

It can furthermore be provided that for producing a welded connection between double-walled plastic pipes, each having one internal pipe and one external pipe, prior to the method step of axially displacing the induction connection sleeve in which the induction connection sleeve in part surrounds the first plastic pipe and the second plastic pipe, at least the following method step is additionally carried out:—welding the two internal pipes of the double-walled plastic pipes. It is of advantage herein that the internal pipes can be welded separately and in a dedicated method step. On account thereof, the internal pipe scan have properties that are different from those of the external pipes.

It can furthermore be provided that the two internal pipes of the double-walled plastic pipes at the end side are welded by heating-element butt welding by means of a welding mirror. It is of advantage herein that a welded connection that is produced in such a manner between two plastic pipes has a high degree of strength, or a high degree of tightness, respectively.

It can finally be provided that, after the welding of the two internal pipes of the double-walled plastic pipes and before the method step of axially displacing the induction connection sleeve in which the induction connection sleeve in part surrounds the first plastic pipe and the second plastic pipe, the mutually welded internal pipes are subjected to a pressure test. It is of advantage herein that on account thereof a visual check, or another type of check, respectively, of the welding of the internal pipes can be performed during pressure testing, since said internal pipes on account of the as yet open external pipes are still visible.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF THE PREFERRED EMBODIMENTS

By way of introduction it is to be stated that identical parts are provided with identical reference signs or identical component identifications, respectively, in the various embodiments described, wherein the disclosures included in the entire description can be applied in an analogous manner to identical parts having identical reference signs or identical component identifications, respectively. Also, the details pertaining to a location selected in the description, such as, for example, top, bottom, lateral, etc. refer to the figure that is directly described and illustrated, and said details pertaining to a location in the case of a change in location have to be applied in an analogous manner to the new location.

An exemplary embodiment of an induction connection sleeve 1 is shown in FIGS. 1 to 6, wherein identical reference signs or component identifications, respectively, as used in the respective preceding figures are used for identical parts. In order to avoid unnecessary repetitions, mention of or reference to, respectively, the detailed description pertaining to the respective preceding figures is made.

Figure 1:
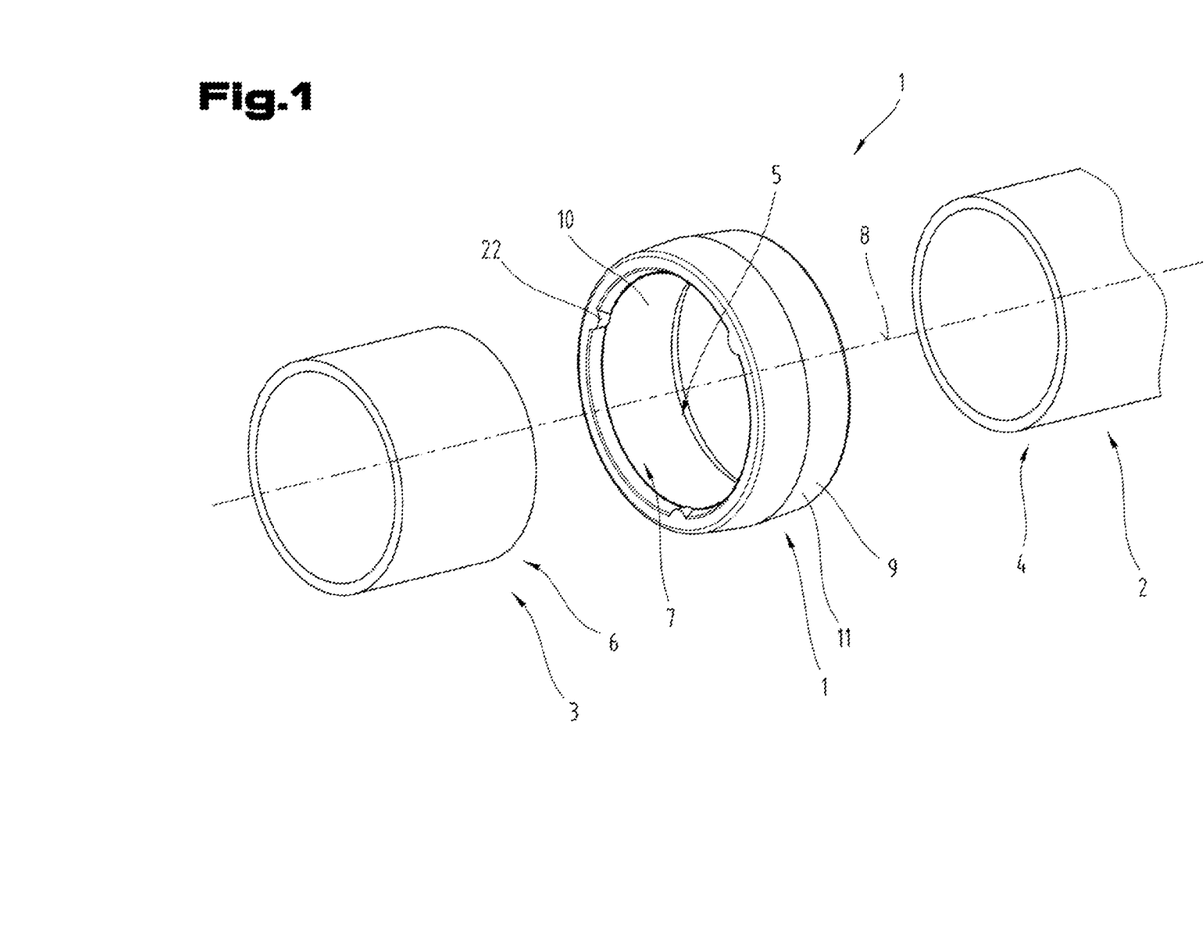
FIG. 1 shows a perspective view of an exemplary embodiment of an induction connection sleeve for connecting by fusing a first plastic pipe to be connected to a second plastic pipe to be connected.

FIG. 1 shows the perspective view of the induction connection sleeve 1 for connecting by fusing a first plastic pipe 2 to be connected to a second plastic pipe 3 to be connected. It is provided in particular that a first connection portion 4 of the first plastic pipe 2 to be connected is push-fitted into a first receptacle portion 5 of the induction connection sleeve 1, and that a second connection portion 6 of the second plastic pipe 3 to be connected is push-fitted into a second receptacle portion 7 of the induction connection sleeve 1. Using the induction connection sleeve 1 described in this document, plastic pipes 2, 3, for example from a thermoplastic plastics material, such as polypropylene (PP), polyethylene (PE), etc. can be interconnected.

The two plastic pipes 2, 3 to be connected and the induction connection sleeve 1 are preferably configured so as to be rotationally symmetrical, and therefore have a central axis 8. By way of the induction connection sleeve 1 the two plastic pipes 2, 3 to be connected can be positioned so as to be mutually coaxial and subsequently be welded to one another by way of the induction connection sleeve 1. The precise welding procedure of the plastic pipes 2, 3 will yet be explained in more detail in further consequence in this document, in particular in FIG. 6.

As can be readily seen in FIG. 1, the induction connection sleeve 1 comprises a sleeve body 9 which is made from an injection-molded thermoplastic plastics material.

The sleeve body 9 comprises an internal part 10 in which the first receptacle portion 5 and the second receptacle portion 7 are configured, and an external part 11 which surrounds the internal part 10. The receptacle portions 5, 7 are disposed so as to be mutually coaxial and mutually offset in the axial direction.

Figure 2:
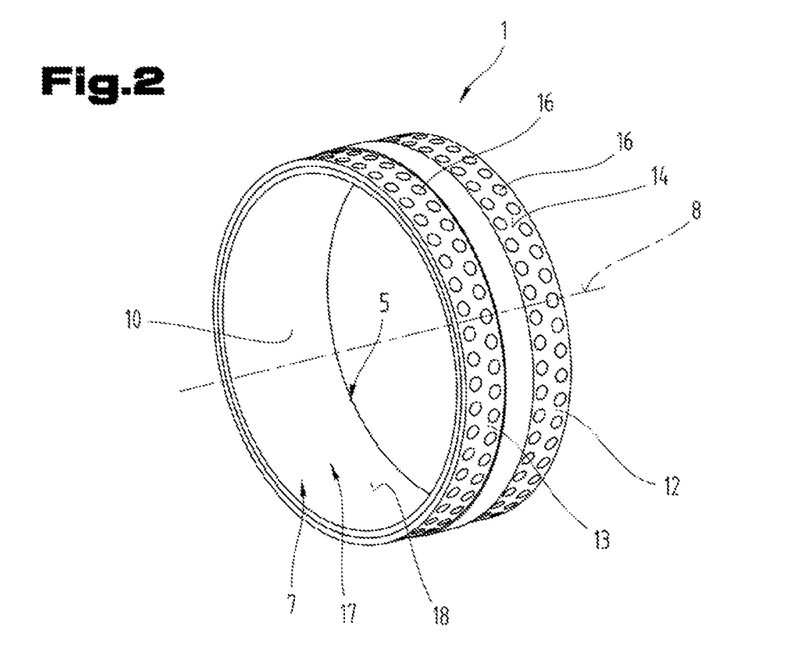
FIG. 2 shows a perspective view of the induction connection sleeve as per FIG. 1, wherein an external part of the sleeve body has been omitted.

FIG. 2 shows a perspective view of the induction connection sleeve 1 as per FIG. 1, wherein the external part 11 of the sleeve body 9 is omitted in this view. As can be seen in FIG. 2, it is provided that a first induction heating element 12 and a second induction heating element 13 are disposed on the internal part 10 of the sleeve body 9. The induction heating elements 12, 13 are configured so as to be bush-shaped and are composed of an electrically conductive material. A material of this type for use in an induction heating element 12, 13 can be, for example, stainless steel, in particular special steel.

It is provided in particular that the first induction heating element 12 is disposed in the external region about the first receptacle portion 5, and that the second induction heating element 13 is disposed in the external region about the second receptacle portion 7. As can be readily seen in FIG. 2, an external shell surface 14 of the first induction heating element 12 and an external shell surface 15 of the second induction heating element 13 are not covered by the molding of the internal part 10.

As can furthermore be seen in FIG. 2, it is provided that recesses 16 which configure cut-outs in the induction heating elements 12, 13 are disposed in the circumference of the two induction heating elements 12, 13. The recesses 16 can be configured in the form of circular recesses, for example. Alternatively thereto, the recesses 16 can have a polygonal cross section.

The induction heating elements 12, 13 can be made from a thin-walled tubular material, for example. Alternatively thereto, it can be provided that the induction heating elements 12, 13 are made from sheet-metal strips which are rolled together in a bush-shaped manner.

As can be readily seen in FIG. 2, it can be provided that the first receptacle portion 5 and the second receptacle portion 7 are disposed in a continuous receptacle portion 17. In the case of a configuration of a continuous receptacle portion 17 of this type no stepped feature is thus configured on an internal shell surface 18 of the internal part 10. The induction heating elements 12, 13 are disposed so as to be mutually coaxial and coaxial in relation to the two receptacle portions 5, 7, or to the continuous receptacle portion 17, respectively.

Figure 3:
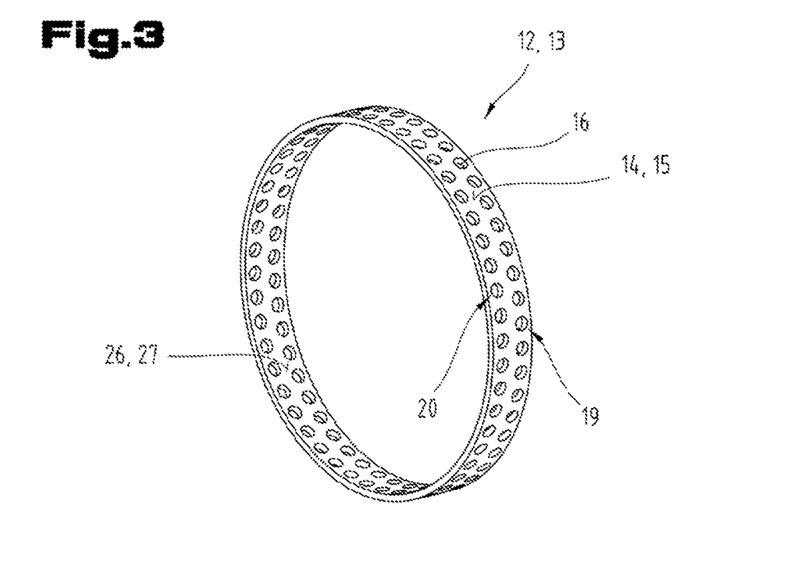
FIG. 3 shows a perspective view of an induction heating element.

FIG. 3 shows a perspective view of the induction element 12, 13. It can be readily seen in FIG. 3 that the recesses 16 in the induction heating elements 12, 13 are disposed so as to be distributed on the circumference. It can be provided in particular that the recesses 16 are disposed beside one another in a first row 19 and in a second row 20. It can furthermore be provided that the recesses 16 of the first row 19 in relation to the circular angle of the circumference are offset in an angular manner in relation to the recesses 16 of the second row 20 such that in the case of a cross section through the induction heating element 12, 13 the cut is made through always only one recess 16 of one of the two recess series 19, 20. This can contribute toward increasing the stability of the induction heating element 12, 13. In the use of comparatively wide induction heating elements 12, 13 it is also conceivable that not only one first 19 and one second recess series 20 are configured, but that further recess series are configured.

Figure 4:
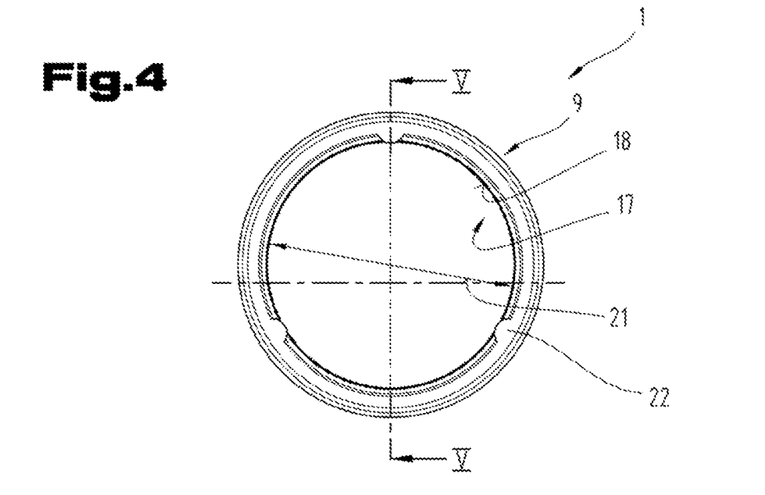
FIG. 4 shows a side view of the induction connection sleeve.

FIG. 4 shows a side view of the induction connection sleeve 1. As can be readily seen in FIG. 4, the continuous receptacle portion 17, or the internal shell surface 18 of the internal part 10, respectively, has an internal diameter 21. The internal diameter 21 is adapted to the external diameter of the plastic pipes 2, 3 to be connected.

As can be readily seen in FIG. 4, it can be provided that at least one position-securing element 22 is disposed on the sleeve body 9, said position-securing element 22 being configured in relation to the internal shell surface 18 of the internal part 10 so as to project toward the center, thus decreasing the available width of the internal shell surface 18. On account thereof, the induction connection sleeve 1 which is push-fitted onto one of the plastic pipes 2, 3 can be jammed and thus be secured in its position. It can preferably be provided that three position-securing elements 22 are disposed so as to be distributed across the circumference of the sleeve body 9. The position-securing elements 22 are herein distributed on the circumference so as to be mutually offset by 120°. The position-securing elements 22 can be configured as semi-circular studs, for example. It is furthermore also conceivable that the position-securing elements 22 are configured in the form of simple elevations. A further number of position-securing elements 22 can also be provided in a further variant of embodiment.

Figure 5:
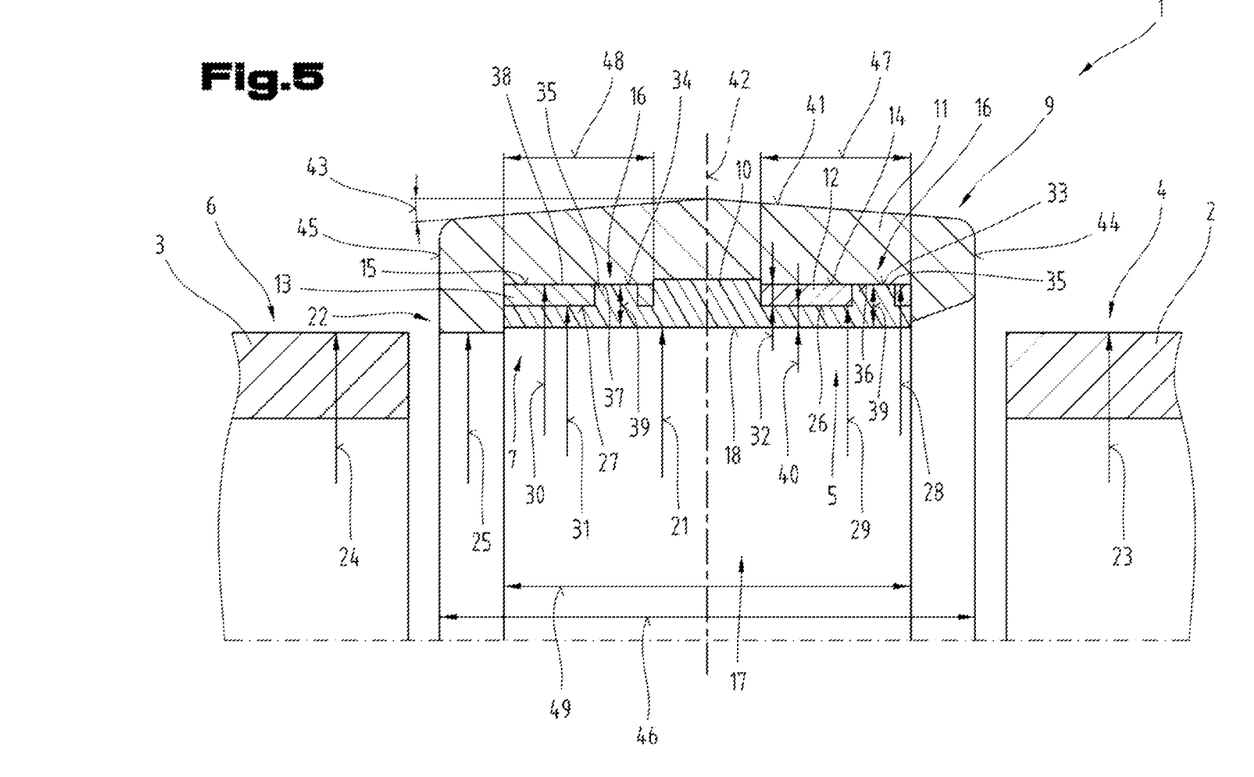
FIG. 5 shows a sectional illustration of the induction connection sleeve according to the section line V-V from FIG. 4.

FIG. 5 shows a sectional illustration of the induction connection sleeve 1, in particular a cross section according to the section line V-V from FIG. 4. Furthermore shown in FIG. 5 are the two plastic pipes 2, 3 to be connected, likewise in a cross-sectional illustration.

As can be particularly readily seen in FIG. 5, the internal diameter 21 of the internal part 10 is chosen so as to be slightly larger than an external diameter 23 of the first plastic pipe 2 to be connected, or than an external diameter 24 of the second plastic pipe 3 to be connected, respectively.

On account thereof it can be achieved that the induction connection sleeve 1 can be readily push-fitted over the plastic pipes 2, 3 to be connected. It is particularly advantageous herein for a clearance fit to be chosen between the external diameter 23 of the first plastic pipe 2 to be connected, or an external diameter 24 of the second plastic pipe 3 to be connected, respectively, and the internal diameter 21 of the internal part 10. It is of advantage when the external diameter 23 of the first plastic pipe 2 to be connected, or an external diameter 24 of the second plastic pipe 3 to be connected, respectively, are of approximately the same size.

As can be particularly readily seen when FIGS. 4 and 5 are viewed together, the position-securing element 22 is disposed so as to project in relation to the internal shell surface 18 of the internal part 10, on account of which said internal part 10 can be jammed on one of the plastic pipes 2, 3. In particular, an available diameter 25 of the position-securing element 22 is chosen such that the former with one of the external diameters 23, 24 of the plastic pipes 2, 3 to be connected forms an interference fit or a press-fit, respectively.

For example, the position-securing element 22 can be molded as an integral component part of the internal part 10 or of the external part 11 of the sleeve body 9. Alternatively thereto, it is also conceivable that the position-securing element 22 is attached to the internal part 10 or the external part 11.

As can furthermore be readily seen in FIG. 5, the first induction heating element 12 has a first internal shell surface 26, and the second induction heating element 13 has a second internal shell surface 27. The external diameter 28 of the first induction heating element 12 is formed by the external shell surface 14 of the first induction heating element 12. The internal diameter 29 of the first induction heating element 12 is formed by the internal shell surface 26 of the first induction heating element 12.

In an analogous manner, the second induction heating element 13 has an external diameter 30 and an internal diameter 31. The difference between the external diameters 28, 30 and the internal diameters 29, 31 of the induction heating elements 12, 13 is referred to as the wall thickness 32 of an induction heating element 12, 13.

The internal part 10 in the region of the first receptacle portion 5, or of the second receptacle portion 7, respectively, has a first external shell surface 33, or a second external shell surface 34, respectively. The first external shell surface 33 of the internal part 10 preferably terminates flush with the external shell surface 14 of the first induction heating element 12, and the second external shell surface 34, in an analogous manner, terminates flush with the external shell surface 15 of the second induction heating element 13. It can be seen herein that the internal part 10 in the form of knobs 35 fills and protrudes through the recesses 16 of the induction heating elements 12, 13.

It can furthermore be seen in FIG. 5 that the external part 11 of the sleeve body 9 in the region of the first receptacle portion 5 has a first internal shell surface 36, and in the region of the second receptacle portion 7 has a second internal shell surface 37. The two internal shell surfaces 36, 37 are preferably congruent with the two external shell surfaces 33, 34 of the internal part 10, or with the external shell surfaces 14, 15 of the induction heating elements 12, 13, respectively. This means in particular that the external part 11 of the sleeve body 9 bears directly on the internal part 10 of the sleeve body 9, or is molded thereto, respectively.

The internal part 10 and the external part 11 are interconnected in a materially integral manner in particular in the region of the recesses 16.

It can be provided in one exemplary embodiment of the induction connection sleeve 1 that the same plastics material is used for the internal part 10 and for the external part 11 of the sleeve body 9. An almost homogenous construction of the plastics material is formed herein in the region of the connection zone between the internal part 10 and the external part 11. On account thereof it can arise in particular that no sharp separation face can be seen between the internal part 10 and the external part 11, but that a transition region is configured wherein a transition from the internal part 10 to the external part 11 can be visible when viewed under a scanning electron microscope. The internal part 10, or the external part 11, respectively, can be constructed from a thermoplastic plastics material such as polypropylene (PP), polyethylene (PE), etc.

In a further variant of embodiment it can be provided that the internal part 10 of the sleeve body 9 is formed from a first plastics from the group of thermoplastic plastics which has a first melting point, and that the external part 11 of the sleeve body 9 is formed from a second plastics, different from the first plastics, from the group of thermoplastic plastics which has a second melting point, wherein the melting point of the second plastics is higher than the melting point of the first plastics. Different types of polypropylene (PP), polyethylene (PE), etc. can likewise be used herein.

In a further variant of embodiment it can be provided that an adhesive agent layer 38 is applied between the internal part 10, or the induction heating elements 12, 13, respectively, and the external part 11. The adhesive agent layer 38 can serve in particular for reinforcing the connection between the internal part 10 and the external part 11, and thus for increasing the strength of the induction connection sleeve 1.

A wall thickness 39 of the internal part 10 is measured in the region of the first receptacle portion 5, or in the region of the second receptacle portion 7, respectively. A overlap 40 results from the difference between the wall thickness 39 of the internal part 10 and the wall thickness 32 of the induction heating element 12, 13. That plastics material which in the course of the welding procedure is fused and connects in a materially integral manner to the pipes 2, 3 to be connected is included in the overlap 40.

As can furthermore be seen in FIG. 5, the external part 11 has an external shell surface 41. It can be provided herein that the external shell surface 41, emanating from the longitudinal center 42, is configured so as to taper in a conical manner. It can be provided in particular that the external shell surface 41 is disposed at a cone angle 43 in relation to an imaginary cylinder shell surface. This cone angle 43 can be between 2° and 10°, in particular between 3° and 7°, preferably between 4° and 5°.

As can furthermore be seen in FIG. 5, the sleeve body 9 in terms of the longitudinal extent thereof extends between a first end face 44 and a second end face 45. It can be provided in particular herein that the first end face 44 and the second end face 45 are formed by the external part 11. A width 46 in the axial direction of the sleeve body 9 results on account of the end faces 44, 45.

The induction heating elements 12, 13 have a width 47 or 48, respectively. The induction heating elements 12, 13 in one preferred exemplary embodiment are embodied so as to be of identical construction such that said induction heating elements 12, 13 have identical dimensions. The internal part 10 has a width 49. It can be provided herein that the width 49 is smaller than the width 46 of the sleeve body 9.

Figure 6:
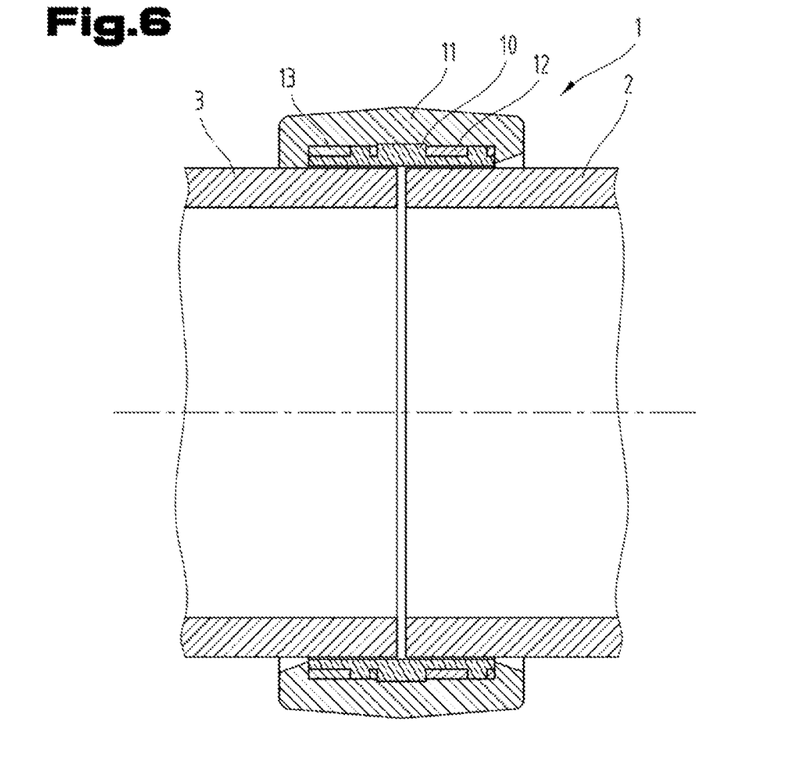
FIG. 6 shows a sectional illustration of the induction connection sleeve having the plastic pipes connected thereto, according to the section line V-V from FIG. 4.

FIG. 6 shows the induction connection sleeve 1, or the two plastic pipes 2, 3 to be connected, respectively, in a cross-sectional illustration according to the section line V-V from FIG. 4.

In the illustration in FIG. 6, the two plastic pipes 2, 3 to be connected, or the induction connection sleeve 1, respectively, are mutually positioned such that the welding procedure can be started. The induction heating elements 12, 13 herein by means of an induction coil are heated in such a manner that at least the internal part 10 is fused. It is to be achieved in particular herein that the internal part 10 fuses in the region of the overlap 40. The plastics material of the internal part 10, on account of this fusing procedure, connects to the first plastic pipe 2 to be connected, and to the second plastic pipe 3 to be connected, respectively. On account thereof, a materially integral connection between the plastic pipes 2, 3 and the induction connection sleeve 1 is established as soon as the fused plastics material has solidified again.

In one potential exemplary embodiment the induction connection sleeve 1 has a width 46 of the sleeve body 9 of 25 mm. The width 49 of the internal part 10 of this induction connection sleeve 1 is 19 mm. The width 47, 48 of the induction heating elements 12, 13 is 7 mm. The diameter of the recesses 16 is 2 mm. The wall thickness 32 of the induction heating elements 12, 13 is 1 mm. The wall thickness 39 of the internal part 10 is 2 mm. The internal diameter 21 of the internal part 10 is 50.5 mm. The available diameter 25 of the position-securing element 25 is 50 mm. An induction connection sleeve 1 having dimensions of this type can be used for connection of plastic pipes 2, 3 having an external diameter 23, 24 of 50 mm.

The manufacturing method for producing the induction connection sleeve 1 will be described by means of FIGS. 7 to 10. In particular, the injection molds for producing the induction connection sleeve are shown in these figures.

Figure 7:
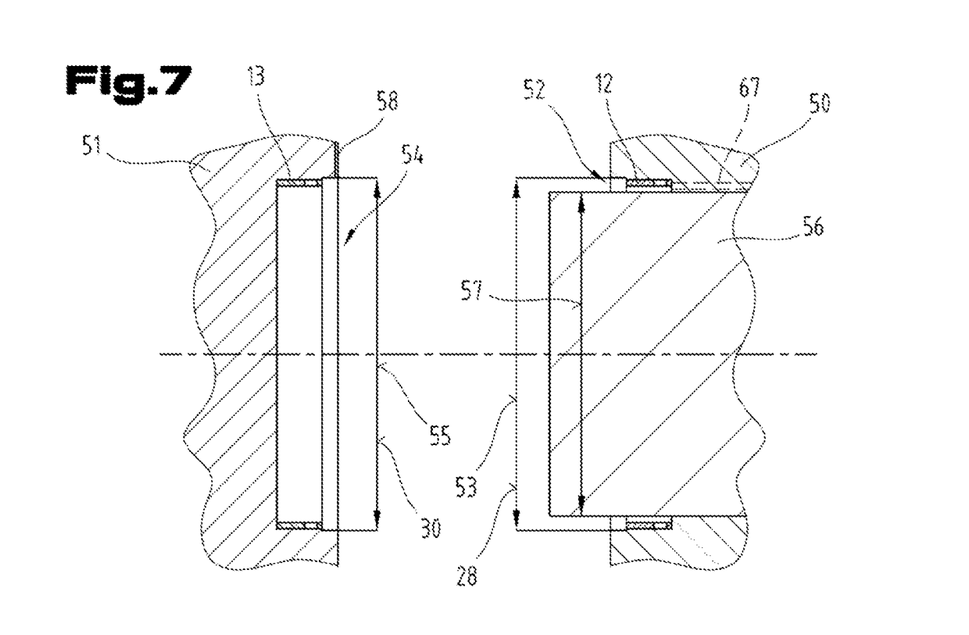
FIG. 7 shows a first and a second mold half for producing the induction connection sleeve.

A first injection-mold half 50 and a second injection-mold half 51 are illustrated in a sectional illustration in FIG. 7. It can be seen herein that the first injection-mold half 50 has a first molding cavity 52 in which the first induction heating element 12 is laid up. The first molding cavity 52 herein has an available diameter 53 which corresponds to the external diameter 28 of the first induction heating element 12. On account thereof, the first induction heating element 12 can be received in a positioned manner in the first injection-mold half 50.

The second injection-mold half 51 has a second molding cavity 54 in which the second induction heating element 13 can be received. In a manner analogous to that of the first injection-mold half 50, the second molding cavity 54 of the second injection-mold half 51 has an available diameter 55 which corresponds to the external diameter 30 of the second induction heating element 13. It is furthermore provided that a first mold core 56 which subsequently configures the internal shell surface 18 of the internal part 10 of the sleeve body 9 is disposed either in the first injection-mold half 50 or in the second injection-mold half 51. It is provided in particular that the diameter 57 of the first mold core 56 corresponds to the internal diameter 21 of the internal part 10.

As can furthermore be seen in FIG. 7, it can be provided that a first sprue 58 which serves for feeding fused plastics material is configured in the second injection-mold half 51. The second injection-mold half 51 in technical terminology is therefore referred to as the nozzle side.

The first injection-mold half 50 in technical terminology is referred to as the ejector side. It can be provided in particular herein that the second injection-mold half 51 is disposed so as to be positionally rigid on the injection molding machine, and that the first injection-mold half 50 is disposed on the injection molding machine so as to be displaceable in relation to the second injection-mold half 51.

Figure 8:
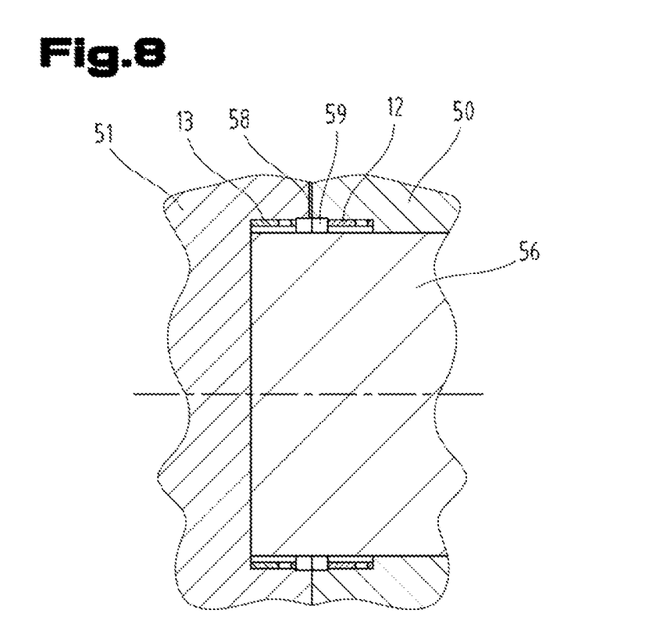
FIG. 8 shows the first and the second mold half for producing the induction connection sleeve in the closed state.

The first injection-mold half 50 in the illustration as per FIG. 8 is moved in the direction of the second injection-mold half 51 so far that the molding cavities 52, 54 are closed and a free space 49 is configured. The injection procedure of the plastics material can thus be started. The free space 49 in the course of the injection molding procedure is filled with plasticized plastics material. In particular, the internal part 10 of the sleeve body 9 will be generated by this method step in a first injection molding procedure.

Figure 9:
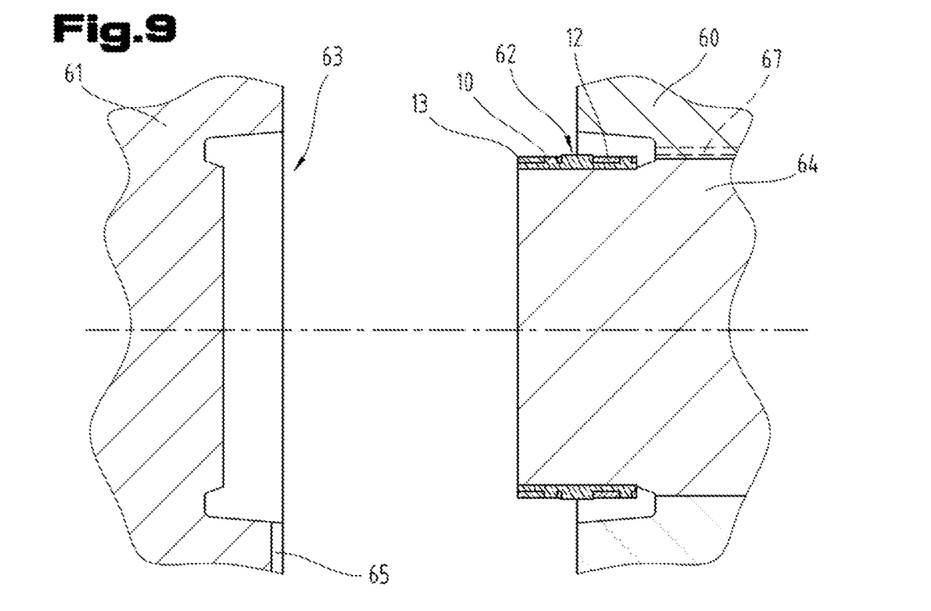
FIG. 9 shows a third and a fourth mold half for producing the induction connection sleeve.
Figure 10:
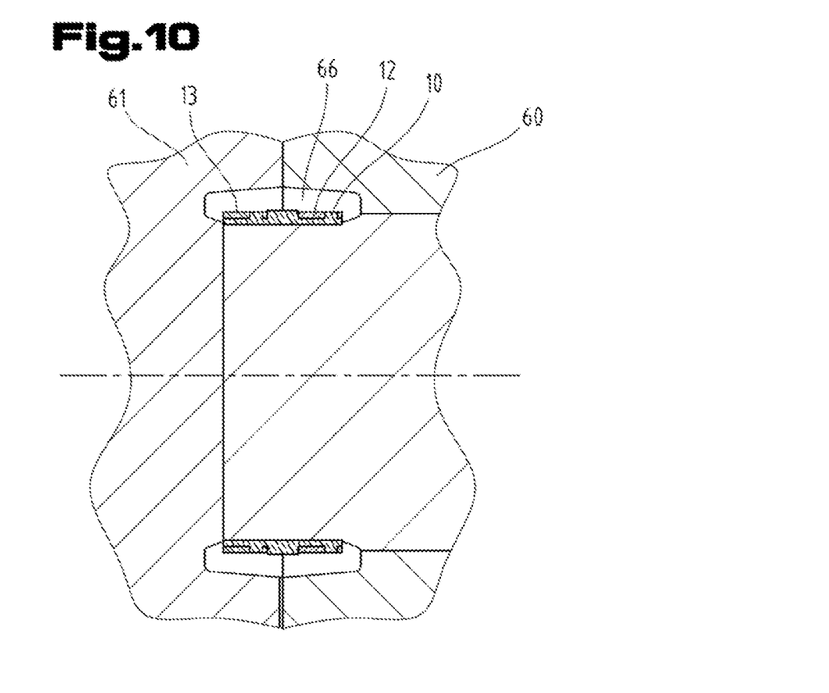
FIG. 10 shows the third and a fourth mold half for producing the induction connection sleeve in the closed state.

In a subsequent method step, the two injection-mold halves 50, 51 are opened again, and the internal part 10 of the sleeve body 9 having the induction heating elements 12, 13 is removed from the injection-mold half 50, 51 and further processed according to the illustration in FIGS. 9 and 10.

FIG. 9 shows a section through a third injection-mold half 60 and a fourth injection-mold half 61. As can furthermore be seen in FIG. 9, it can be provided that a third molding cavity 62 which interacts with a fourth molding cavity 63 of the fourth injection-mold half 61 is configured in the third injection-mold half 60. It is provided in particular herein that the third and the fourth molding cavity 62, 63 forms the contour of the external shell surface 41 of the external part 11. As can furthermore be seen in FIG. 9, a further mold core 64 which serves for receiving the internal part 10 having the induction heating elements 12, 13 is provided in the third 60 or the fourth injection-mold half 61. As can be seen in FIG. 9, it can be provided that a second sprue 65 for supplying plastics material is provided in the third 60 or the fourth injection-mold half 61.

In a further method step, the third injection-mold half 60 is moved in the direction of the fourth injection-mold half 61 until the injection-mold halves 60, 61 assume a closed position corresponding to that of FIG. 10.

As can be seen in FIG. 10, a radial gap 66 which serves for configuring the external part 11 is configured by the third molding cavity 62 and by the fourth molding cavity 63.

Corresponding to a variant of embodiment not illustrated, it can also be provided that the third 60 and the fourth injection-mold half 61 are constructed in such a manner that a molding cavity 62 which is provided for shaping the complete induction connection sleeve 1 is configured only in the third injection-mold half 60, for example, and that the fourth injection-mold half 61 is configured as a lid without a recess for closing the third injection-mold half 60.

As is schematically illustrated in FIGS. 7 and 9, it can be provided that an ejector 67 which serves for ejecting the internal part 10 of the sleeve body 9 having the induction heating elements 12, 13 from the first 50 or the second injection-mold half 51 is provided. In an analogous manner it can be provided that ejecting the finished induction connection sleeve 1 is carried out by means of an ejector 67 which is disposed in the third or the fourth injection-mold half 60, 61.

Figure 11:
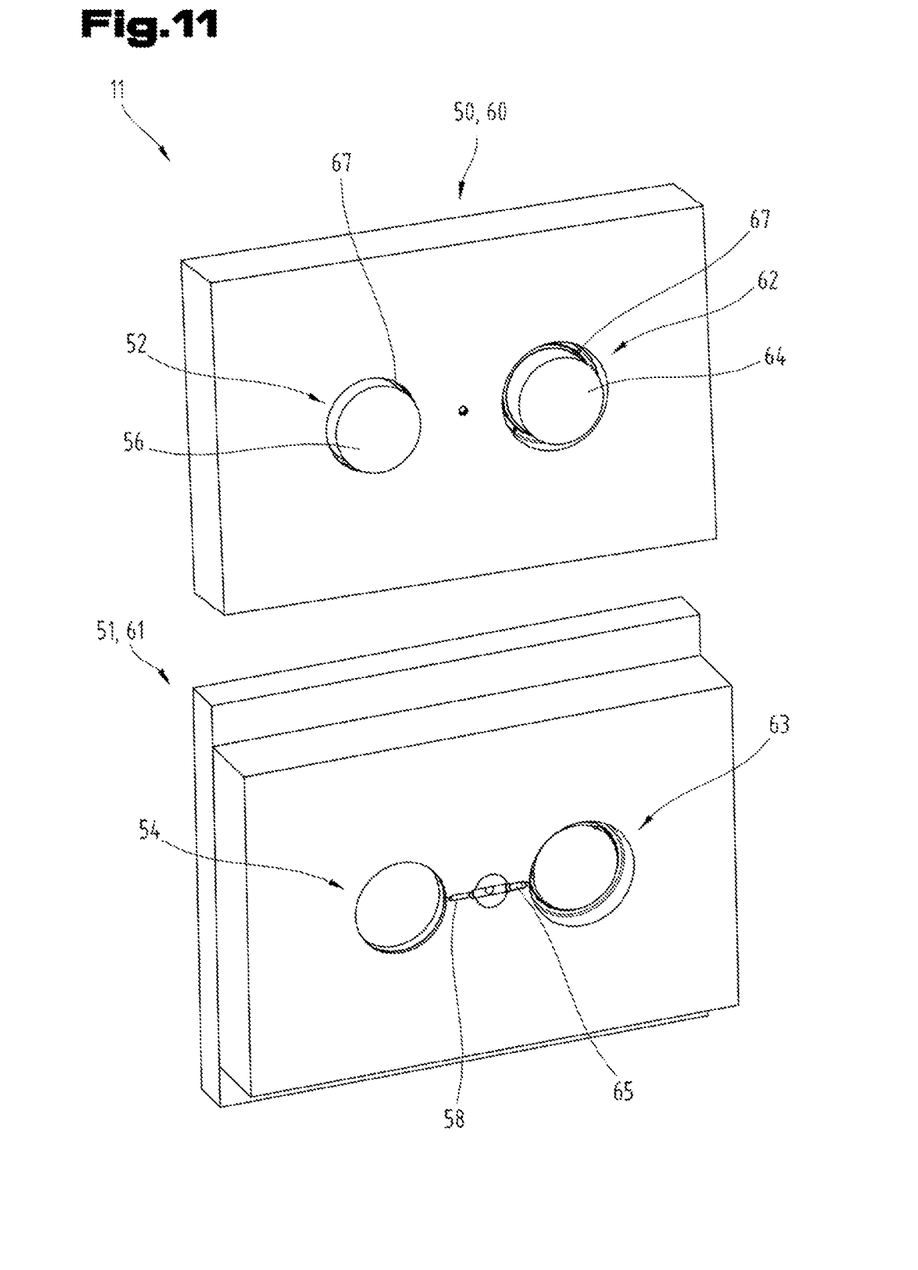
FIG. 11 shows a perspective view of a potential arrangement of the four mold halves on two clamping plates.

A further and optionally independent embodiment of a device 68 for producing the induction connection sleeve 1 is shown in FIG. 11, wherein identical reference signs or component identifications as in the preceding FIGS. 7 to 10 are used again for the same parts. In order to avoid unnecessary repetitions, mention of or reference to, respectively, the detailed description in the preceding FIGS. 7 to 10 is made.

FIG. 11 shows a perspective view of the device 68 for producing the induction connection sleeve 1. It can be seen herein that it can be provided that the first 50 and the third injection-mold half 60 can be disposed on a common clamping plate. Furthermore, the second 51 and the fourth injection-mold half 61 can be disposed on a common clamping plate. The two clamping plates are illustrated so as to be rotated in such manner that the molding cavities 52, 54, 62, 63 are visible.

As can furthermore be seen in FIG. 11, it can be provided that the first sprue 58 and the second sprue 65 are fed by way of a common sprue duct.

The exemplary embodiments show potential variants of embodiment of the induction connection sleeve 1, or of the device 68 for producing the induction connection sleeve 1, wherein it is to be noted at this point that the invention is not limited to the variant embodiments thereof which are illustrated specifically and that, instead, diverse mutual combinations of the individual variant embodiments are also possible and, based on the technical teaching through the actual invention, these possible variations are within the capability of a person skilled in this technical field.

Figure 12:
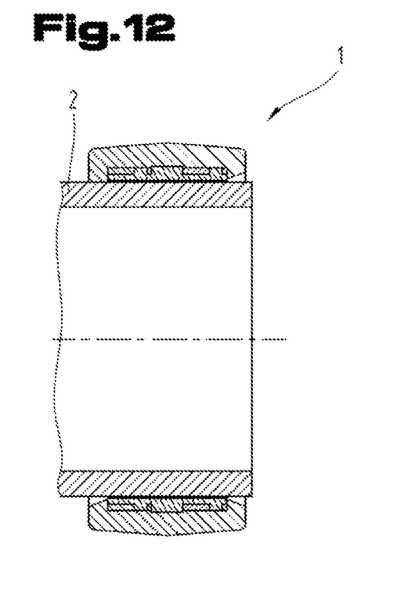
FIG. 12 shows a method step for producing a welded connection between two plastic pipes, wherein the induction connection sleeve is push-fitted onto the first plastic pipe.
Figure 13:
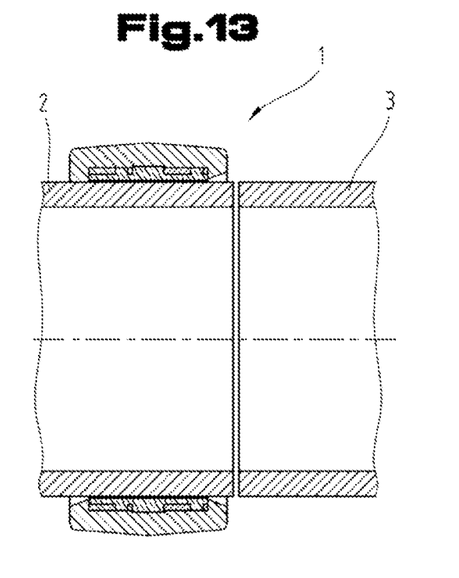
FIG. 13 shows a method step for producing a welded connection between two plastic pipes, wherein the second plastic pipe is positioned in relation to the first plastic pipe.
Figure 14:
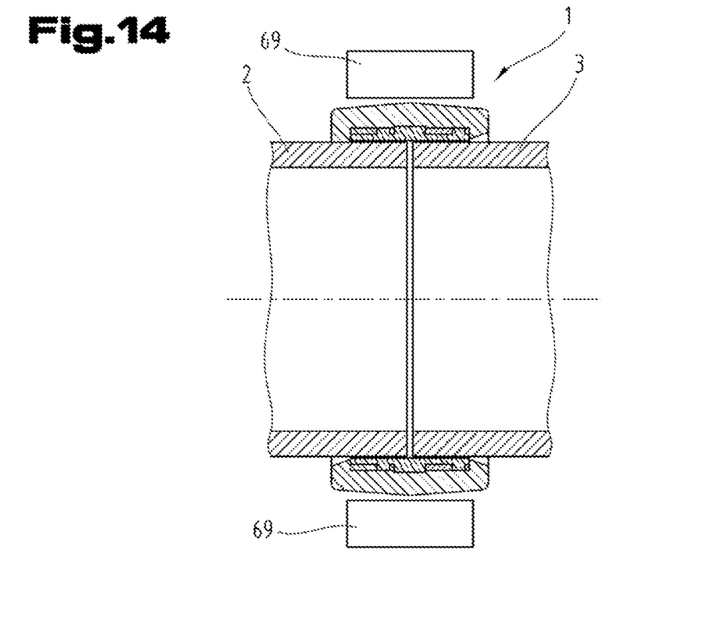
FIG. 14 shows a method step for producing a welded connection between two plastic pipes, wherein the plastic pipes are connected by the induction connection sleeve.

The individual method steps of a potential method for producing a welded connection between the first plastic pipe 2 and the second plastic pipe 3 are shown in FIGS. 12 to 14, wherein the welded connection is produced with the aid of the induction connection sleeve 1. The plastic pipes 2, 3 which are illustrated in these method steps are single-walled plastic pipes 2, 3.

FIG. 12 shows the first method step for producing the welded connection. It can be seen in this figure that the first plastic pipe 2 and the induction connection sleeve 1 are provided, wherein the induction connection sleeve 1 is push-fitted onto the first plastic pipe 2. The induction connection sleeve 1 is push-fitted onto the first plastic pipe 2 so far until the induction connection sleeve 1 no longer projects in relation to an end face of the first plastic pipe 2. In other words, the induction connection sleeve 1 is push-fitted onto the first plastic pipe 2 so far until the full width 46 of the sleeve body 9 surrounds the external diameter 23 of the first plastic pipe 2. The sleeve body 9 by way of the entire width 46 thereof thus overlaps or engages across the first plastic pipe 2 in the axial direction.

In a further method step corresponding to FIG. 13, the second plastic pipe 3 is then positioned in relation to the first plastic pipe 2. It can be provided that the two plastic pipes 2, 3 are mutually spaced apart, or else that the two plastic pipes 2, 3 on the end sides thereof tightly bear on one another.

In a further method step which is illustrated in FIG. 14, the induction connection sleeve 1 is push-fitted over the two plastic pipes, such that they are both at least partially overlapped. Preferably the induction connection sleeve 1 displaced across the two plastic pipes 2, 3 such that said induction connection sleeve 1 overlaps said two plastic pipes 2, 3 equally, that is to say is placed so as to be centric between them.

When the induction connection sleeve 1 is correctly placed, in a further method step which is likewise illustrated in FIG. 14, an inducing device 69 is placed and activated in the region of the induction connection sleeve 1. A current is induced in the two induction heating elements 12, 13 by the inducing device 69. The induction heating elements 12, 13 are heated on account thereof, and thus ensure that the plastics of the internal part 10 of the sleeve body 9 is softened or is at least in part fused and, on account thereof, can connect to the plastic pipes 2, 3. A materially integral connection between the sleeve body 9 and the two plastic pipes 2, 3 is produced on account thereof.

The individual method steps of a further potential method for producing a welded connection between the first plastic pipe 2 and the second plastic pipe 3 is shown in FIGS. 15 to 18, wherein two double-walled plastic pipes 2, 3 are interconnected here.

Figure 15:
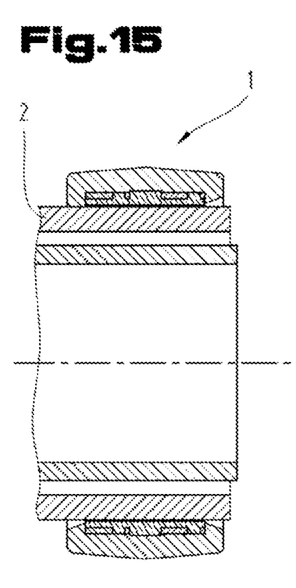
FIG. 15 shows a method step for producing a welded connection between two double-walled plastic pipes, wherein the induction connection sleeve is push-fitted onto the first plastic pipe.

The two double-walled plastic pipes 2, 3 each have one internal pipe 70, 71 which is disposed within one external pipe 72, 73, wherein the internal pipe 70, 71 and the associated external pipe 72, 73 are interconnected by a web, for example, such that said pipes are mutually coaxial.

The method step as per FIG. 15 is identical to the method step as per FIG. 12, wherein the induction connection sleeve 1 is push-fitted onto the first plastic pipe 2 in this method step.

Figure 16:
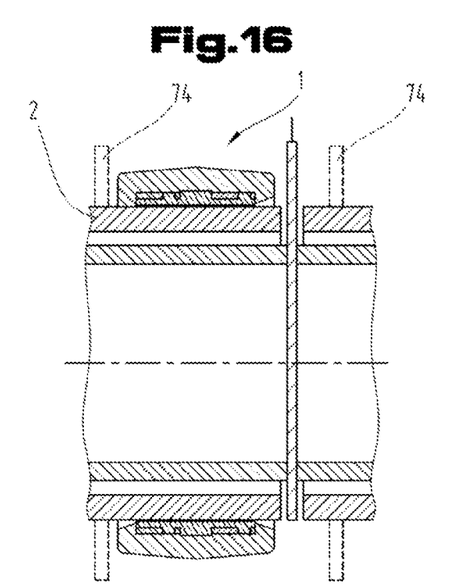
FIG. 16 shows a method step for producing a welded connection between two double-walled plastic pipes, wherein the internal pipes are being heated by way of a welding mirror.

In a further method step which is illustrated in FIG. 16, the two plastic pipes 2, 3 are held by means of a clamping device 74 and are pressed against a heating element or else a welding mirror 75. The two plastic pipes 2, 3 herein are configured in such a manner that only the end sides of the two internal pipes 70, 71 bear on one another. In other words, the two internal pipes 70, 71 at the end side are configured so as to project in relation to the external pipes 72, 73.

The contact pressure by way of which the two internal pipes 70, 71 are pressed against one another herein, or the contact pressure time and the heating element temperature, respectively, depends on the structure or the geometry, respectively, of the internal pipes 70, 71.

Figure 17:
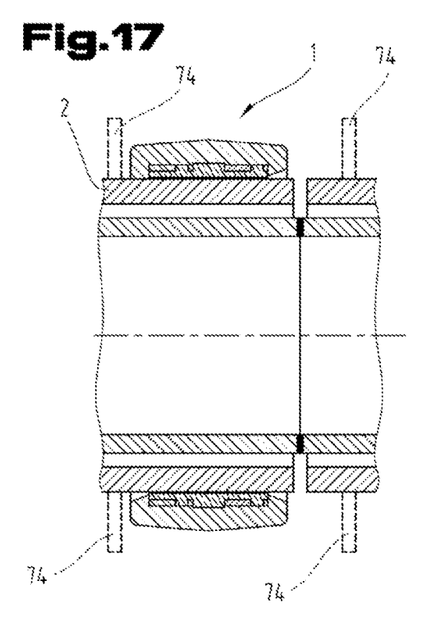
FIG. 17 shows a method step for producing a welded connection between two double-walled plastic pipes, wherein the internal pipes are being welded.
Figure 18:
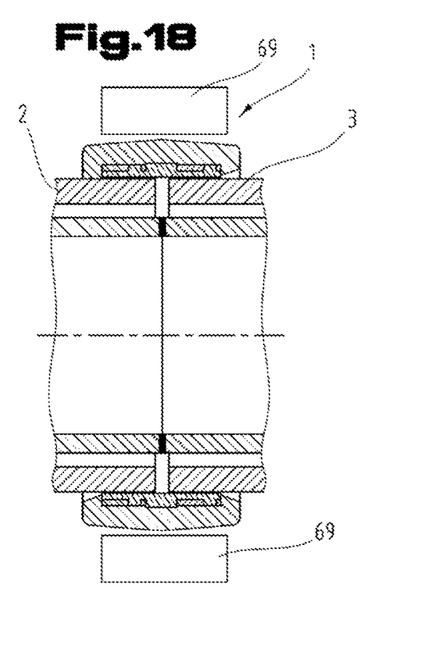
FIG. 18 shows a method step for producing a welded connection between two double-walled plastic pipes, wherein the external pipes are being welded by means of the induction connection sleeve.

In a further method step such as is illustrated in FIG. 17, the welding mirror 75 is removed from the location between the two internal pipes 70, 71, and the latter by way of the clamping device 74 are butted against one another. On account of the preheating by means of the welding mirror 75 and on account of the pressure that is exerted by means of the clamping device 74, the two internal pipes 70, 71 can interconnect in a materially integral manner. The clamping device 74 can be removed once the two internal pipes 70, 71 have interconnected.

In an alternative variant it can be provided that another welding method is used for welding the internal pipes.

A tightness test can be subsequently carried out in a further method step, wherein the two interconnected internal pipes 70, 71 are pressurized. The tightness of the welded connection of the internal pipes 70, 71 can be checked by way of the annular gap in the external pipes 72, 73, such as can be readily seen in FIG. 17.

Once the tightness test has been carried out, the induction connection sleeve 1, in a further method step such as is illustrated in FIG. 17, can be displaced across the two plastic pipes 2, 3 and be welded in a manner corresponding to the method steps that have already been described in the context of FIG. 14.

Furthermore, individual features or combinations of features from the various exemplary embodiments shown and described may also represent solutions that are in themselves independent, inventive or according to the invention.

The object addressed by the independent inventive solutions can be derived from the description.

All of the indications of ranges of values in the present description should be understood as meaning that they include any and all subranges thereof; for example, the indication 1 to 10 should be understood as meaning that all of the subranges on the basis of the lower limit 1 and the upper limit 10 are included, i.e. all subranges begin with a lower limit of 1 or greater and end with an upper limit of 10 or less, for example 1 to 1.7, or 3.2 to 8.1, or 5.5 to 10.

Above all, the individual embodiments shown in FIGS. 1, 2, 3, 4, 5, 6, 7, 8, 9, 10, 11, 12 to 14, and 15 to 18 can form the subject matter of independent solutions according to the invention. The respective objects and solutions according to the invention can be derived from the detailed description of these figures.

For the sake of good order, it should finally be pointed out that, for better understanding of the construction of the induction connection sleeve 1, or of the device 68 for producing the induction connection sleeve 1, respectively, these and their component parts respectively have sometimes been illustrated not to scale and/or enlarged and/or reduced in size.

| List of reference signs | |
|---|---|
| 1 | Induction connection sleeve |
| 2 | First plastic pipe to be connected |
| 3 | Second plastic pipe to be connected |
| 4 | First connection portion |
| 5 | First receptacle portion |
| 6 | Second connection portion |
| 7 | Second receptacle portion |
| 8 | Central axis |
| 9 | Sleeve body |
| 10 | Internal part of the sleeve body |
| 11 | External part of the sleeve body |
| 12 | First induction heating element |
| 13 | Second induction heating element |
| 14 | External shell surface first induction heating element |
| 15 | External shell surface second induction heating element |
| 16 | Recess in induction heating element |
| 17 | Continuous receptacle portion |
| 18 | Internal shell surface internal part |
| 19 | First recess series |
| 20 | Second recess series |
| 21 | Internal diameter internal part |
| 22 | Position-securing element |
| 23 | External diameter first plastic pipe to be connected |
| 24 | External diameter second plastic pipe to be connected |
| 25 | Available diameter position-securing element |
| 26 | Internal shell surface first induction heating element |
| 27 | Internal shell surface second induction heating element |
| 28 | External diameter first induction heating element |
| 29 | Internal diameter first induction heating element |
| 30 | External diameter second induction heating element |
| 31 | Internal diameter second induction heating element |
| 32 | Wall thickness induction heating element |
| 33 | First external shell surface internal part |
| 34 | Second external shell surface internal part |
| 35 | Knob |
| 36 | First internal shell surface external part |
| 37 | Second internal shell surface external part |
| 38 | Adhesive agent layer |
| 39 | Wall thickness internal part |
| 40 | Overlap |
| 41 | External shell surface external part |
| 42 | Longitudinal center |
| 43 | Cone angle |
| 44 | First end face sleeve body |
| 45 | Second end face sleeve body |
| 46 | Width sleeve body |
| 47 | Width first induction heating element |
| 48 | Width second induction heating element |
| 49 | Width internal part |
| 50 | First injection-mold half |
| 51 | Second injection-mold half |
| 52 | First molding cavity |
| 53 | Available diameter first molding cavity |
| 54 | Second molding cavity |
| 55 | Available diameter second molding cavity |
| 56 | First mold core |
| 57 | Diameter first mold core |
| 58 | First sprue |
| 59 | Free space |
| 60 | Third injection-mold half |
| 61 | Fourth injection-mold half |
| 62 | Third molding cavity |
| 63 | Fourth molding cavity |
| 64 | Further mold core |
| 65 | Second sprue |
| 66 | Radial gap |
| 67 | Ejector |
| 68 | Device for producing the induction connection sleeve |
| 69 | Inducing device |
| 70 | First internal pipe |
| 71 | Second internal pipe |
| 72 | First external pipe |
| 73 | Second external pipe |
| 74 | Clamping device |
| 75 | Welding mirror |

What is claimed is:

1. A method for producing an induction connection sleeve, wherein the method comprises the following method steps:

laying up a first induction heating element in a first injection-mold half, wherein the first injection-mold half has a first molding cavity for receiving the first induction heating element, said first molding cavity having an available diameter which corresponds to the external diameter of the first induction heating element, wherein the first induction heating element is received in a positioned manner in the first injection-mold half;

laying up a second induction heating element in a second injection-mold half that interacts with the first injection-mold half, wherein the second injection-mold half has a second molding cavity for receiving the second induction heating element, said second molding cavity having an available diameter which corresponds to the external diameter of the second induction heating element, wherein the second induction heating element is received in a positioned manner in the second injection-mold half;

mutual compressing of the first and the second injection-mold half, wherein the first and/or the second injection-mold half have/has a first mold core which for receiving the induction heating elements is disposed so as to be centric to the molding cavities and serves for molding a first and a second receptacle portion of the induction connection sleeve;

injecting a thermoplastic plastics material into the first and the second molding cavity, wherein an internal part of a sleeve body of the induction connection sleeve is formed, said internal part in the internal side having the first and the second receptacle portion, and the induction heating elements at least in regions being embedded in said internal part, wherein recesses that are disposed in the circumference of the induction heating elements are penetrated by the plastics material of the internal part;

opening the first and the second injection-mold half;

ejecting the internal part of the sleeve body having the induction heating elements from one of the injection-mold halves;

laying up the internal part of the sleeve body having the induction heating elements in a third injection-mold half, wherein the third injection-mold half has a third molding cavity for receiving the internal part of the sleeve body, a further mold core for positioning the internal part being disposed in said third molding cavity, and wherein a radial gap for molding an external part of the sleeve body is configured between the external circumference of the internal part and the third molding cavity;

closing the third molding cavity;

injecting a thermoplastic plastics material into the third molding cavity, wherein the external part of the sleeve body is formed;

opening the third molding cavity; and ejecting the finished induction connection sleeve.

2. The method for producing an induction connection according to claim 1, wherein a fourth injection-mold half having a fourth molding cavity is provided for closing the third molding cavity, said fourth molding cavity interacting with the third molding cavity of the third injection-mold half.

3. The method for producing an induction connection sleeve according to claim 2, wherein the first and the third injection-mold half are disposed on a common clamping plate, and wherein the second and the fourth injection-mold half are disposed on a common clamping plate, wherein the first and the third injection-mold half form a nozzle side, and the second and the fourth injection-mold half form an ejector side and are moved simultaneously.

4. The method for producing an induction connection sleeve according to claim 1, wherein the ejecting of the internal part of the sleeve body having the induction heating elements molded thereon and/or ejecting the finished induction connection sleeve are/is carried out by means of ejectors which are disposed in one of the injection-mold halves.

* * * * *